(12) United States Patent
Gaucel et al.

(10) Patent No.: US 9,159,138 B2
(45) Date of Patent: Oct. 13, 2015

(54) DEVICE AND METHOD FOR DYNAMIC ADAPTATION OF SPATIAL RESOLUTION FOR IMAGER FOURIER TRANSFORM SPECTROMETERS

(71) Applicant: THALES, Neuilly-sur-Seine (FR)

(72) Inventors: Jean-Michel Gaucel, Mandelieu (FR); Denis Simeoni, Cannes-la-Bocca (FR); Sandrine Mathieu, Cannes-la-Bocca (FR)

(73) Assignee: THALES, Courbevoie (FR)

( * ) Notice: Subject to any disclaimer, the term of this patent is extended or adjusted under 35 U.S.C. 154(b) by 2 days.

(21) Appl. No.: 14/194,377

(22) Filed: Feb. 28, 2014

(65) Prior Publication Data

US 2014/0247990 A1   Sep. 4, 2014

(30) Foreign Application Priority Data

Mar. 1, 2013   (FR) ...................................... 13 00466

(51) Int. Cl.
*G06T 7/00* (2006.01)
*G01J 3/45* (2006.01)

(52) U.S. Cl.
CPC  *G06T 7/0081* (2013.01); *G01J 3/45* (2013.01)

(58) Field of Classification Search
USPC ....................................................... 382/180
See application file for complete search history.

(56) References Cited

U.S. PATENT DOCUMENTS 5,621,526 A   4/1997   Kuze
7,259,861 B1  8/2007   Crain et al.

OTHER PUBLICATIONS

D. Blumstein, et al., "IASI Instrument: Technical Overview and Measure Performances", Proceedings of SPIE Infrared Spaceborne Remote Sensing XII, Nov. 4, 2004, pp. 196-207, vol. 5543, XP055089109.

*Primary Examiner* — Duy M Dang
(74) *Attorney, Agent, or Firm* — Baker & Hostetler LLP

(57) ABSTRACT

A device and method for dynamically adapting spatial resolution for imager Fourier transform spectrometers makes it possible to acquire data in interferogram mode and image mode on survey points for an observed scene, each survey point being associated a matrix of macro-pixels and defined by a plurality of zones. For each survey point, analysis of the content of each zone is carried out on the basis of data of the image mode. Classification into clear zone or non-clear zone is carried out as a function of proportion of cloud, and clear-pixel data are generated on the basis of the sum of the data of the macro-pixels of the clear zone class. Survey point data are generated on the basis of the sum of the data of all the macro-pixels of the matrix associated with the survey point. The survey point and clear pixel data streams are transmitted to the ground.

10 Claims, 5 Drawing Sheets

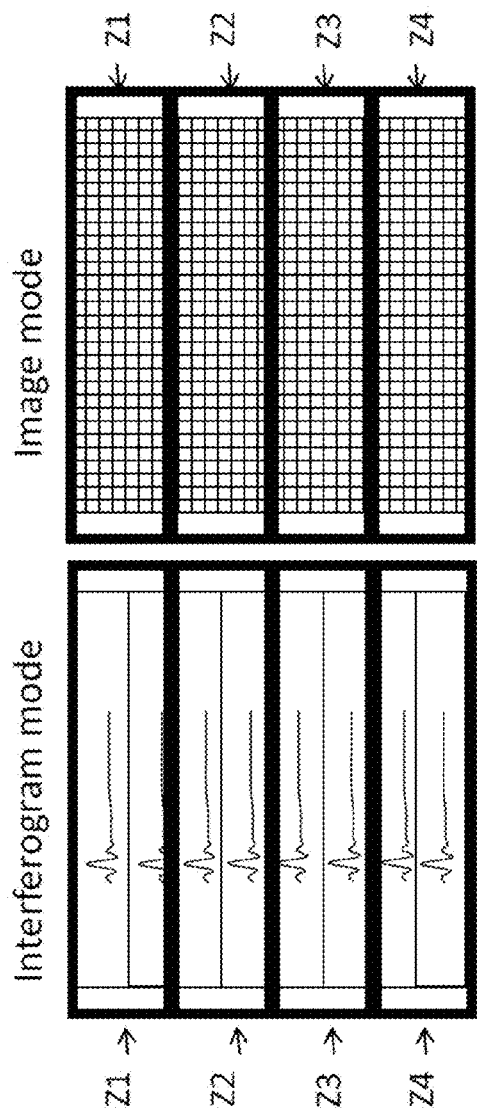
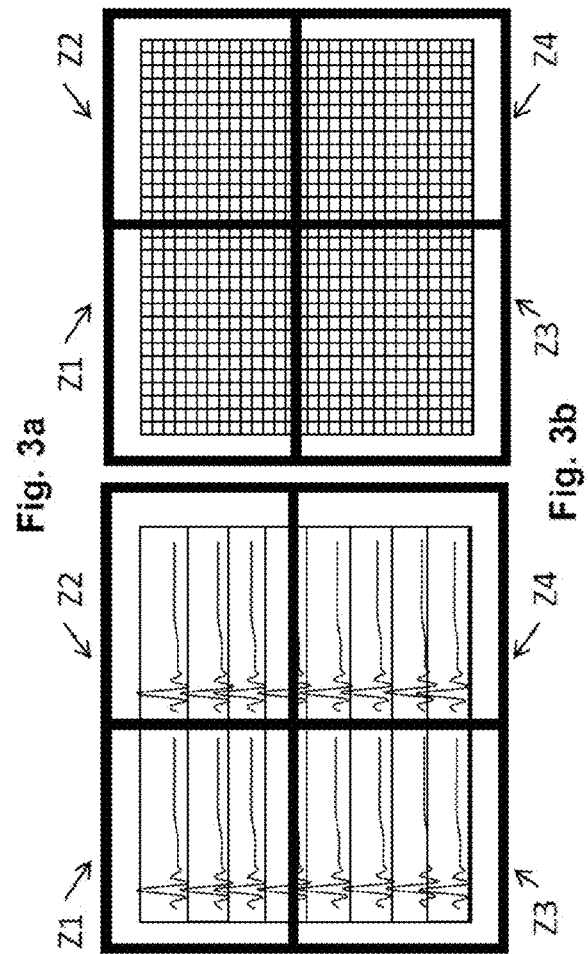
Fig. 3a
Fig. 3b

DEVICE AND METHOD FOR DYNAMIC ADAPTATION OF SPATIAL RESOLUTION FOR IMAGER FOURIER TRANSFORM SPECTROMETERS

CROSS-REFERENCE TO RELATED APPLICATION

This application claims priority to foreign French patent application No. FR 1300466, filed on Mar. 1, 2013, the disclosure of which is incorporated by reference in its entirety.

FIELD OF THE INVENTION

The present invention relates to a method and a device for dynamically adapting spatial resolution, notably for earth observation devices, and more particularly for imager Fourier transform spectrometers.

BACKGROUND

A Fourier transform spectrometer, commonly designated by the initials "FTS", is an instrument observing a scene with a relatively low spatial resolution—that is to say size of survey point—and a very fine spectral resolution. It is typically coupled to a so-called "imager" device, working in spectral broadband, whose spatial resolution is finer. The aim of coupling the FTS with an imager is to improve FTS instrument data geo-location.

By way of example, in a meteorological observation satellite, the Fourier transform spectrometer makes it possible to observe the spectrum of the light in the infrared/near infrared region, and its spatial resolution may be of the order of 10 to 20 kilometers. The Fourier transform spectrometer is coupled with an imager of finer resolution, of the order of a kilometer.

Known Fourier transform spectrometers comprise an analogue detector disposed in a pupil plane. More recent Fourier transform spectrometers—called imager FTSs—comprise, as replacement for the analogue detector, a matrix detector placed in an image plane which decomposes a survey point—representing the final resolution of the instrument—into elementary pixels. This decomposition makes it possible notably to perform digital compensation for the field effect or "self-apodization", or else to employ, in addition to the "FTS mode", an image mode, that is to say a mode making it possible to image the field of view of a survey point with a fine spatial resolution. This image mode can replace the "imager instrument". The physical pixels forming such a matrix are typically produced by the technology commonly designated by the initials CMOS corresponding to the conventional terminology "Complementary Metal Oxide Semiconductor", or CCD technology corresponding to the conventional terminology "Charge-Coupled Device". In order to optimize the signal-to-noise ratio, the reading of the detector is performed with spatial resolutions that vary according to the mode. Hereafter, the term "macro-pixel" designates the "digital" resolution of the Fourier transform spectrometer in the "FTS mode", and the term "super-pixel" designates the "digital" resolution in the image mode. A super-pixel can be formed by a physical pixel of the detection matrix, or else by a grouping of physical pixels, for example of 2×2 or 3×3 pixels, according to the spatial resolution requirement needed for the image mode. A macro-pixel defining the spatial resolution of the FTS mode is in practice formed by a plurality of physical pixels of the detection matrix, for example disposed according to an alignment in one or more rows or in one or more columns of physical pixels of the matrix, in the direction of the interferometric fringes so as to preserve a contrast on the modulated signal which is sufficient (>40%) within each macro-pixel.

The data acquisition time, called the "exposure time", is decomposed, for spectrometers of imager FTS type, into a time which comprises an acquisition phase in FTS mode and an acquisition phase in image mode, the FTS mode acquisition phase covering of the order of 98% of the exposure time.

The FTS data are essentially used to study/monitor the composition of the atmosphere. Now, utilization of the data with this objective is possible only in a clear scene, that is to say for a cloudless observed scene. A scene considered clear typically contains less than 5% of cloud of the surface area of the survey point. Thus, if a survey point contains a proportion of clouds which is greater than a threshold value of the order of 5%, the data can hardly be utilized by the scientific community. Statistically only a low proportion of the acquired data is in a clear scene (<20%).

The requirement therefore exists for a solution which alleviates these drawbacks. The present invention is aimed at remedying the existing limitations by proposing a novel system for dynamic adaptation of spatial resolution for spectrometers.

SUMMARY OF THE INVENTION

An aim of the invention is to increase the data utilization rate in a mixed scene (partially cloudy sky).

Advantageously, the present invention applies to satellite optical observation and can be used notably in meteorological observation satellites.

Advantageously, the present invention makes it possible to improve the acquired survey point processing in mixed scenes, that is to say in clear and cloudy scenes.

Still advantageously, the present invention makes it possible to improve the processing of the survey points acquired in a clear scene for heterogeneous observation zones such as sea beds and land floors.

Thus, the subject of the invention is a method for adapting the spatial resolution of an imager Fourier transform spectrometer (FTS). The method comprising the following steps:
  acquisition of data in interferogram mode and in image mode on survey points for an observed scene, each survey point being associated with a matrix of macro-pixels and defined by a plurality of zones;
  for each survey point:
    analysis on the basis of the data of the image mode of the content of each zone;
    classification according to the result of the analysis of each zone into a clear zone class or into a non-clear zone class;
    generation of "clear pixel" data on the basis of the sum of the data of the macro-pixels of the clear zone class and of "survey point" data on the basis of the sum of the data of all the macro-pixels of the said matrix associated with the said survey point; and
  transmission of the "survey point" data and the "clear pixel" data.

In a particular aspect, the method of the invention comprises a step of defining a plurality of zones which consists in splitting the survey point into zones of equal geometry.

In a particular aspect of the invention, the step of analyzing the content of a zone consists in determining the proportion of cloud in the analysed zone.

In a particular aspect of the invention, a step of compensating for the field effect—called self-apodization—is applied to the macro-pixels of the interferogram mode.

In a particular aspect of the invention, a step of radiometric, spectral or geometric correction is applied to the macro-pixels of the interferogram mode.

In a particular aspect, the invention comprises a step of determining whether the survey points are heterogeneous.

In a particular aspect, the transmission step consists in transmitting a data stream obtained on the basis of the sum of the data of all the macro-pixels if the survey points are not heterogeneous.

In a particular aspect, the invention comprises a step of compressing the survey point data and/or the "clear zone" data before the transmission step.

The subject of the invention is also a device for adapting the spatial resolution of an imager Fourier transform spectrometer (FTS), the device comprising:
  means for acquiring data in interferogram mode and in image mode on survey points for an observed scene, each survey point being associated a matrix of macro-pixels and defined by a plurality of zones;
  for each survey point:
    means for analysing, for each survey point on the basis of the data of the image mode, the content of each zone;
    means for classifying, according to the result of the analysis, each zone into a clear zone class or into a non-clear zone class;
    means for generating "clear pixel" data on the basis of the sum of the data of the macro-pixels of the clear zone class and "survey point" data on the basis of the sum of the data of all the macro-pixels of the said matrix associated with the said survey point; and
  means for transmitting the "survey point" data and the "clear pixel" data.

The subject of the invention is also a computer program for executing the steps of the method of the invention.

The subject of the invention is also a computer program product comprising the computer program making it possible to execute the steps of the method of the invention.

The subject of the invention is also an observation instrument comprising a system for dynamic adaptation of spatial resolution according to the invention.

BRIEF DESCRIPTION OF THE DRAWINGS

Other characteristics and advantages of the invention will become apparent with the aid of the description which follows given with regard to the appended drawings where:
FIGS. 3a and 3b show diagrammatically the splitting into equal zones of a survey point in two modes of implementation.

DETAILED DESCRIPTION

Generally, an observation satellite comprises a home platform onboard which an instrumentation module is embedded. The instrumentation module comprises a picture-taking instrument, for example an optical instrument such as a Fourier transform interferometer (FTS), which collects the light originating from a scene to be observed, for example a region of the surface of the terrestrial globe or a region of space, which passes through the interferometer and is then transmitted to a detection system allowing measurement of the luminous flux.

The measurement of the luminous flux output by the interferometer makes it possible to characterize various parameters such as the concentration of certain gases in the atmosphere as a function of altitude for example.

Generally, the field of view of the instrument comprises a plurality of measurement points.

Figure 1B:
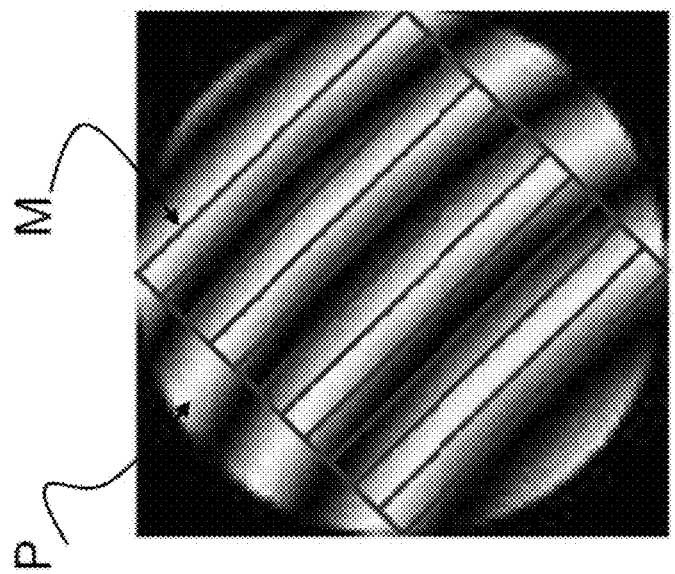
FIGS. 1a and 1b show survey points according to the principle of acquisition of an imager FTS.
Figure 1A:
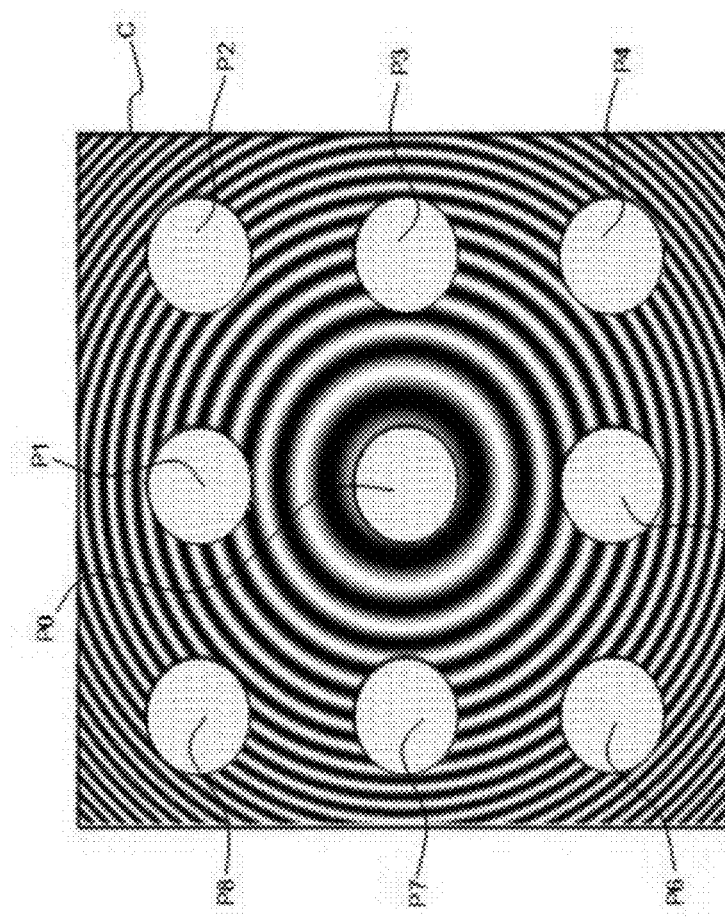

FIG. 1a presents a diagram which comprises nine survey points (P0 to P8) in the field of view of the interferometer. The example of FIG. 1a is not limiting in the number and in the location of the survey points; the person skilled in the art will appreciate that the principle of the invention can be applied to any variant as regards the number and location of the survey points.

The "self-apodization" effect, also called "field effect" gives rise to concentric interference fringes C as represented in FIG. 1a. This effect, if it is present, obliges the decomposition of the survey point into elementary element called macro-pixel so as to preserve contrast when the path length difference increases and the fringes become finer and finer.

FIG. 1b illustrates in a schematic manner a decomposition of a survey point (P) into a matrix (M) of macro-pixels. In the chosen example, the macro-pixels are oriented in the direction of the fringes so as to limit their number while preserving good contrast. In this configuration a macro-pixel width of 0.55 fringes at the maximum path length difference makes it possible to preserve a contrast of greater than 40%.

Figure 2:
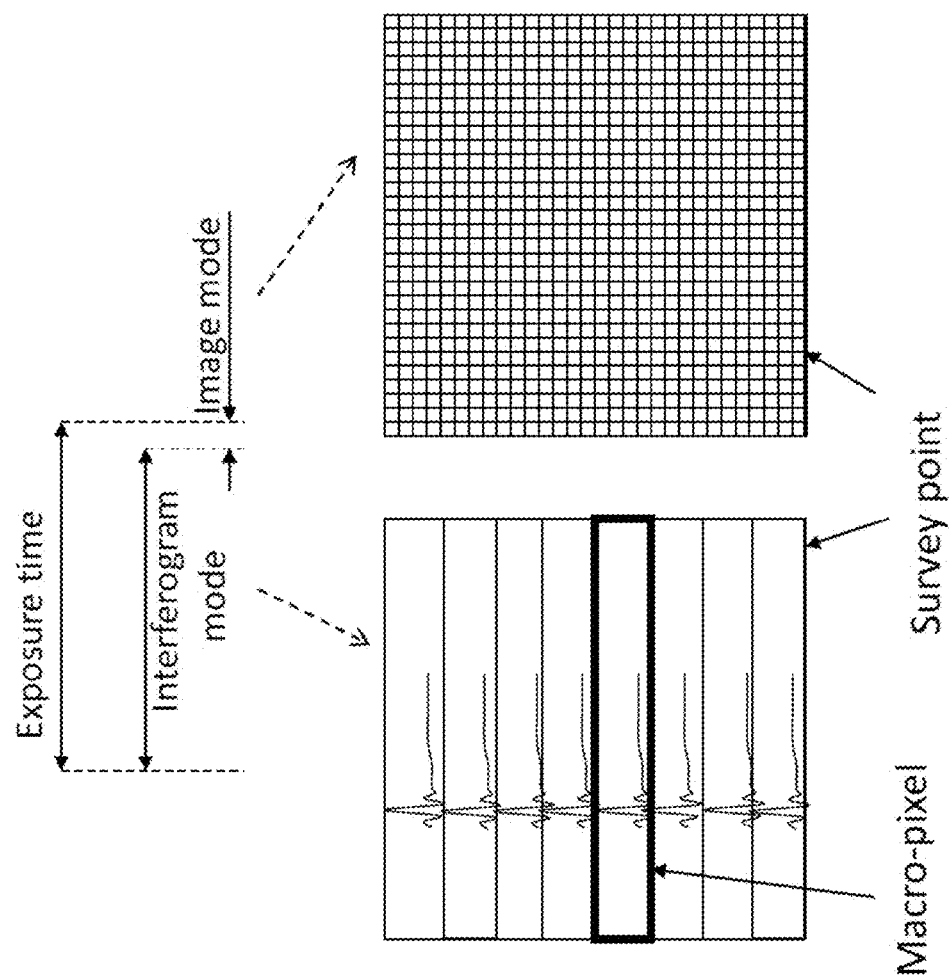
FIG. 2 illustrates the acquisition of the data of an imager FTS during an exposure time.

FIG. 2 illustrates the two modes of data acquisition of an imager FTS for a survey point. For one and the same scene, the exposure time decomposes into an acquisition of interferograms where one speaks of FTS mode, and an acquisition of images where one speaks of image mode. During the image mode, the detection matrix is read at the super-pixel scale. During the FTS mode the matrix is read at the macro-pixel scale. In the non-limiting example illustrated by FIG. 2, the macro-pixels are formed by groupings of pixels by rows, in the alignment of the interferometric fringes. However, they could in other exemplary embodiments be formed by groupings of pixels by columns, or any other geometry allowing either the best possible tracking of the imaging of the interferometric fringes on the detection matrix, or making it possible to improve the zoning of the survey point (for example like the 16 macro-pixels of FIG. 3b), or to simplify the production of the detector.

FIGS. 3a and 3b schematically illustrate a splitting into equal zones of a survey point according to two modes of implementation. In FIG. 3a, the survey point is segmented into four equal rectangular zones Z1 to Z4.

In FIG. 3b, the survey point is segmented into four equal square zones Z1 to Z4.

In a preferential implementation, each zone consists of an whole number of macro-pixels and the entire set of zones covers the survey point.

Indeed, any overlap between zones must be avoided since it gives rise to complications during the radiometric calibration of the signal.

The choice of the zones determines the statistical quantity of clear zone which will be obtained. The smaller the surface area of the zones, the larger the clear zone statistic. Also the closer the zones are to a circle, the larger the statistic.

Thus, statistically the choice of a zone based on macro-pixels is the preferential mode but its implementation must be compatible with the instrument bitrate.

For example in the case of FIG. 3a the choice of 4 zones is preferable since the macro-pixels are very elongate and the gain is not very significant with respect to a configuration with 8 zones. Moreover small zones could lead to a degradation in the probability of good detection of the clear zones and thus a degradation in the effective rate of useful clear zones.

Figure 4A:
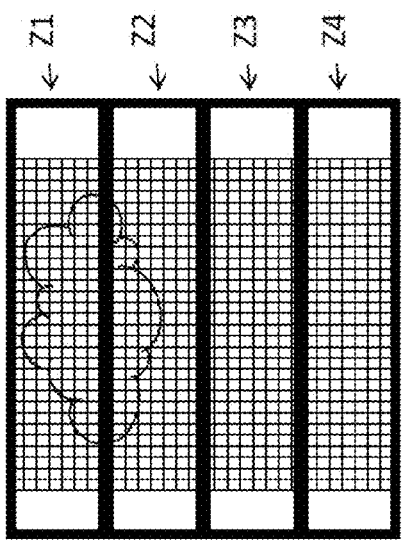
FIGS. 4a and 4b show diagrammatically the content of the zones according to the two modes of implementation of FIGS. 3a and 3b.
Figure 4A:
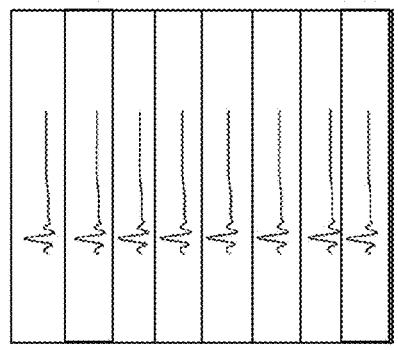
Figure 4B:
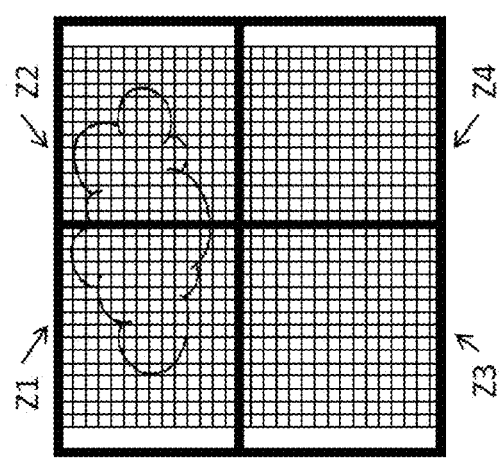
Figure 4B:
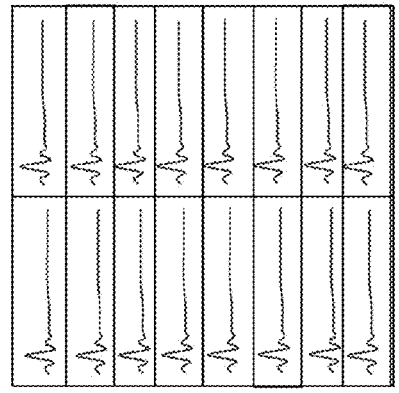

FIGS. 4a and 4b schematically illustrate the content of the zones according to the two modes of splitting of FIGS. 3a and 3b. By way of nonlimiting example, the scene observed at the survey point comprises clouds in two zones of the splitting, the zones Z1 and Z2. The zones Z3 and Z4 do not contain respectively any cloud. As is described later with reference to FIG. 5, each zone is analysed to detect the proportion of cloud so as to classify it as cloudy or partially cloudy zone, or as cloudless clear zone, and thus adapt the spatial resolution of the data transmitted to the ground.

Figure 5:
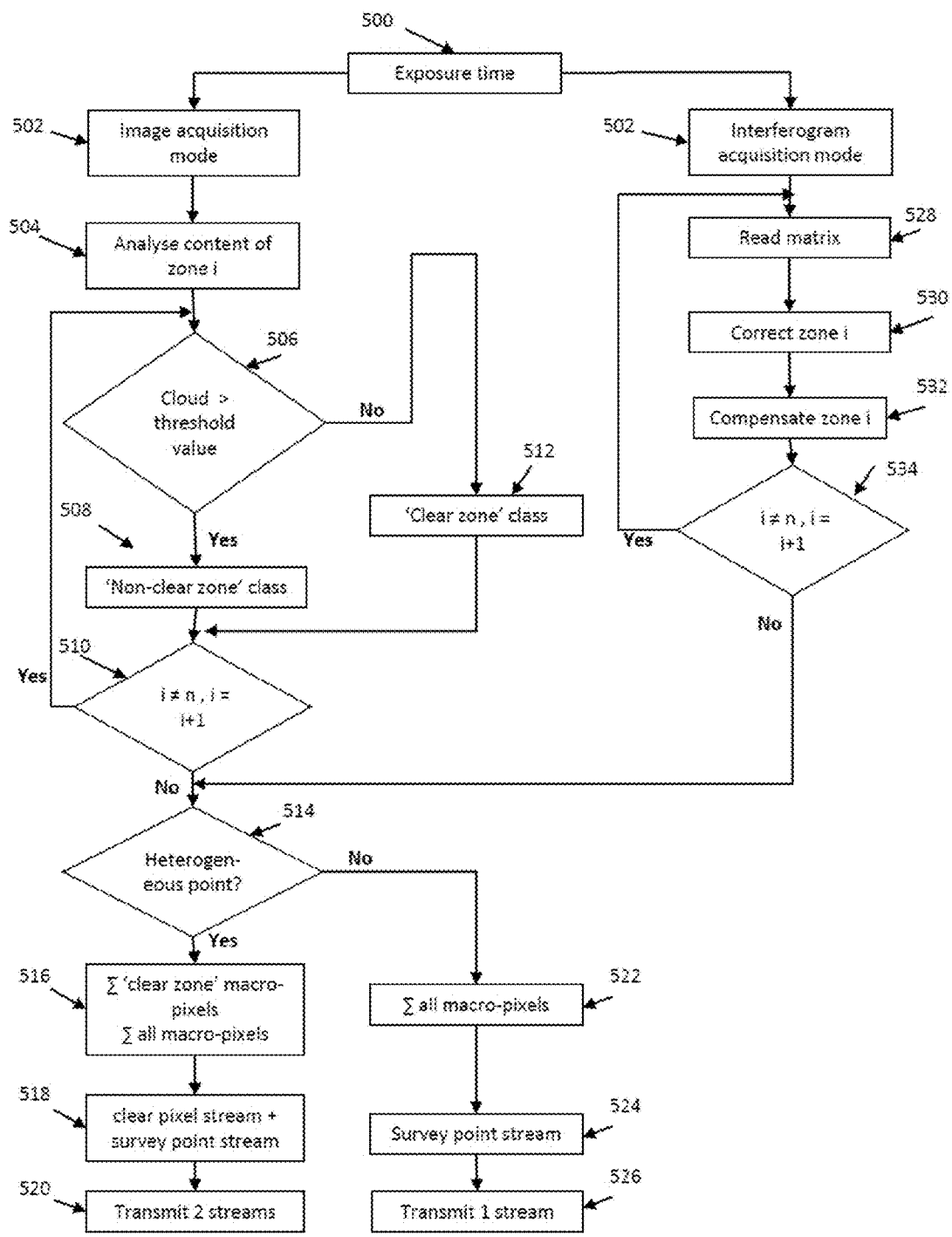
FIG. 5 shows a schematic of the method of the invention in one embodiment.

FIG. 5 describes the steps operated by the method of the invention in an embodiment. The method starts in step 500 during an exposure time, with the acquisition of the data (502) in interferogram mode and in image mode of one and the same scene. As described previously, each survey point is associated with a matrix of macro-pixels of the interferogram mode and is defined by a splitting into 'n' zones. It should be noted that the choice of the splitting into 'n' zones is in a preferential manner defined during the instrument design phase.

In a following step 504, the content of each zone is analysed, and then a determination is carried out in step 506 to detect the proportion of clouds in the analysed zone. If the zone contains a proportion of clouds that is greater than a threshold value then it is classified as "non-clear zone" in step 508 and the method continues the analysis of the content of the following zone 510. If the zone does not contain any clouds or the proportion is less than the threshold value, the zone is classified as "clear zone" in step 512, and the method continues the analysis of the content of the following zone with step 510.

When all the zones have been analysed, the method proceeds with step 514 where a test is carried out to determine whether there exist clear zones and non-clear zones, that is to say to determine whether the survey point is heterogeneous.

If the survey point is heterogeneous, the method continues to step 516, where the macro-pixels corresponding to the zones classified as "clear zone" are summed (adaptation of the spatial resolution), and where all the macro-pixels corresponding to the entire set of clear and non-clear zones are summed.

In the following step 518, a "clear zone" data stream is generated, and a "survey point" data stream is generated. The two data streams can be transmitted to the following step 520. The person skilled in the art will appreciate that the streams can be compressed before their transmission.

If, during step 514, the method determines that the survey point is homogeneous, that is to say that all the zones are classified as belonging to one and the same single class, the method proceeds with step 522 where all the macro-pixels corresponding to the single zone are summed. In the following step 524, a "survey point" data stream is generated. The data stream can be transmitted to the following step 526. The person skilled in the art will appreciate that the stream can be compressed before its transmission.

The compressed data can be transmitted to the ground by radio-transmission means when the satellite is in visibility of a ground control station.

In a parallel method, the matrix of macro-pixels acquired in interferogram mode in step 502 is read in step 528. Optional processings of radiometric, spectral or geometric correction type can be applied in step 530 zone-wise. A field compensation can be applied in a following step 532, with a summation of the macro-pixels inside each zone. The method loops back (534) to read all the zones of the matrix. When all the zones are read, and optionally processed, the method proceeds with step 514.

Thus the present invention makes it possible to utilize the data of the image mode to generate extra data which can be transmitted in addition to the data arising from the reading of the interferograms.

The present description illustrates a preferential implementation of the invention, but is not limiting. An example was chosen to allow good understanding of the principles of the invention, and a concrete application, but it is in no way exhaustive and should allow the person skilled in the art to introduce modifications and variants of implementation while retaining the same principles.

The present invention makes it possible to appreciably increase the quantity of clear survey points of an imager FTS while having weak production constraints.

The present invention can be implemented on the basis of hardware and/or software elements. The present method can be implemented in software in a microprocessor for example of LEON, POWERPC or DSP21020 type, or in hardware by using a technology of FPGA or ASIC type. A part of the invention can be available in the guise of computer program product on a computer readable medium. The medium can be electronic, magnetic, optical, electromagnetic or be a distribution medium of infrared type. Such media are, for example, semi-conductor memories (Random Access Memory RAM, Read-Only Memory ROM), tapes, magnetic or optical diskettes or discs (Compact Disk-Read Only Memory (CD-ROM), Compact Disk-Read/Write (CD-R/W) and DVD).

The invention claimed is:

1. A method for adapting a resolution of an imager Fourier transform spectrometer, comprising:
    acquiring data in interferogram mode and in image mode on survey points for an observed scene, each survey point being associated a matrix of macro-pixels and defined by a plurality of zones;
    for each survey point:
        analyzing on the basis of the data of the image mode of the content of each zone;
        classifying according to the result of the analyzing, of each zone into a clear zone class or into a non-clear zone class;
    for each survey point having clear zones and non-clear zones:
        summing the data of the macro-pixels of the clear zone class to generate a clear pixel data stream and summing the data of all the macro-pixels of the said matrix of macro-pixels associated with the said survey point to generate a survey point data stream; and
    transmitting the two data streams.

2. The method according to claim 1 further comprising a preliminary step of defining a plurality of zones which consists in splitting the survey point into zones of equal geometry.

3. The method according to claim 1 in which the step of analyzing the content of a zone consists in determining the proportion of cloud in the analysed zone.

4. The method according to claim 1 further comprising a step of field compensation applied to the macro-pixels of the interferogram mode.

5. The method according to claim 1 further comprising a step of radiometric, spectral or geometric correction applied to the macro-pixels of the interferogram mode.

6. The method according to claim 1 further comprising a step of determining whether the survey points are heterogeneous.

7. The method according to claim 6 where the transmission step consists in transmitting a data stream obtained on the basis of the sum of the data of all the macro-pixels if the survey points are not heterogeneous.

8. The method according to claim 1 further comprising a step of compressing the data before the transmission step.

9. A device for adapting a resolution of an imager Fourier transform spectrometer, the spectrometer allowing a transmission of data based on survey point, the device comprising means for implementing a method for adapting a resolution of an imager Fourier transform spectrometer, comprising:
- acquiring data in interferogram mode and in image mode on survey points for an observed scene, each survey point being associated a matrix of macro-pixels and defined by a plurality of zones;
- for each survey point:
  - analyzing on the basis of the data of the image mode of the content of each zone;
  - classifying according to the result of the analyzing, of each zone into a clear zone class or into a non-clear zone class;
- for each survey point having clear zones and non-clear zones:
  - summing the data of the macro-pixels of the clear zone class to generate a clear pixel data stream and summing the data of all the macro-pixels of the said matrix of macro-pixels associated with the said survey point to generate a survey point data stream; and
- transmitting the two data streams.

10. An observation instrument comprising a device for adapting a resolution of an imager Fourier transform spectrometer, the spectrometer allowing a transmission of data based on survey point, the device comprising means for implementing a method for adapting a resolution of an imager Fourier transform spectrometer, comprising:
- acquiring data in interferogram mode and in image mode on survey points for an observed scene, each survey point being associated a matrix of macro-pixels and defined by a plurality of zones;
- for each survey point:
  - analyzing on the basis of the data of the image mode of the content of each zone;
  - classifying according to the result of the analyzing, of each zone into a clear zone class or into a non-clear zone class;
- for each survey point having clear zones and non-clear zones:
  - summing the data of the macro-pixels of the clear zone class to generate a clear pixel data stream and summing the data of all the macro-pixels of the said matrix of macro-pixels associated with the said survey point to generate a survey point data stream; and
- transmitting the two data streams.

\* \* \* \* \*